Feb. 20, 1968  J. HENRY  3,369,303
PLEATING METHODS AND APPARATUS
Filed April 18, 1966  3 Sheets-Sheet 1
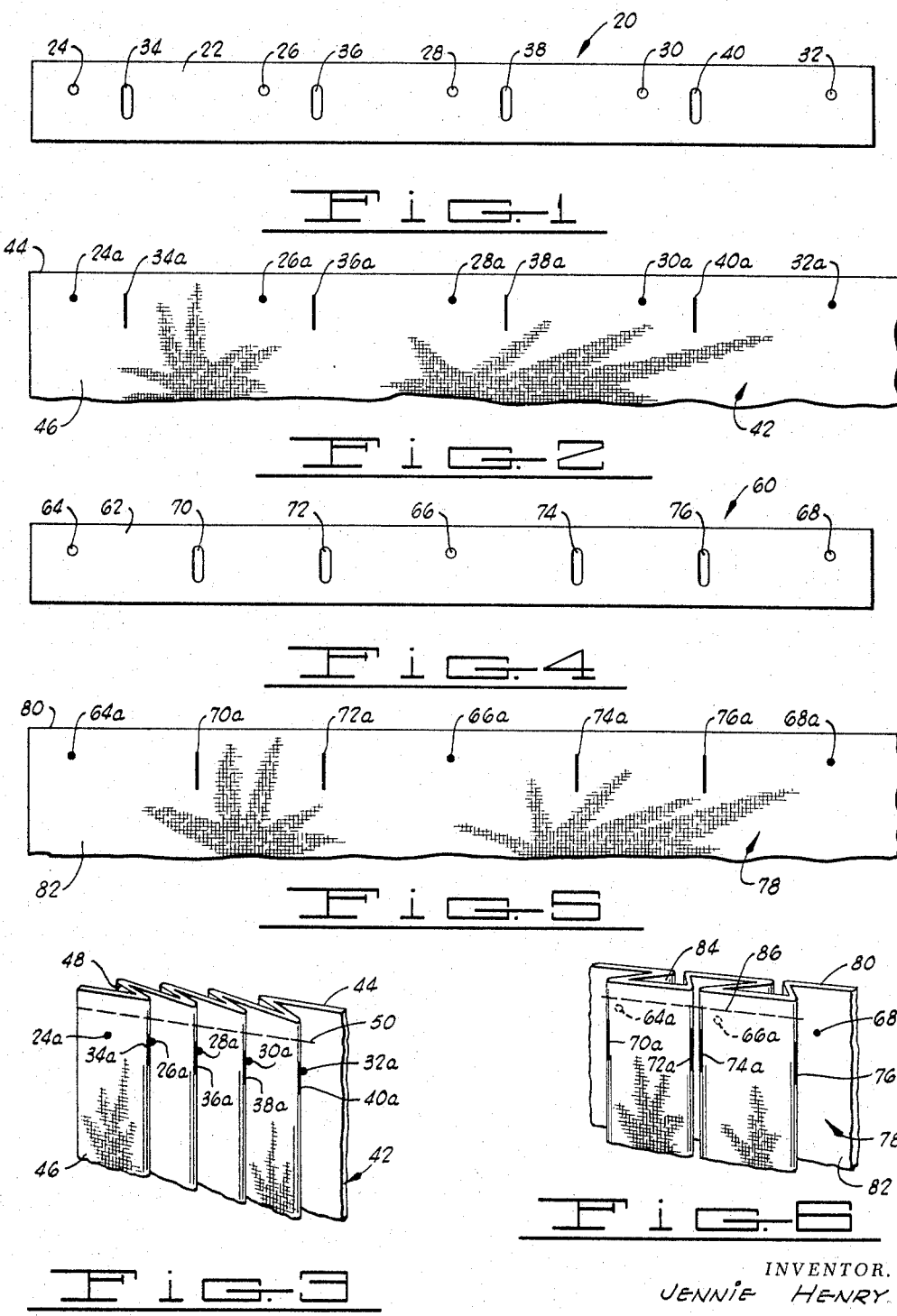
INVENTOR.
JENNIE HENRY
BY
Dunlap and Laney
ATTORNEYS

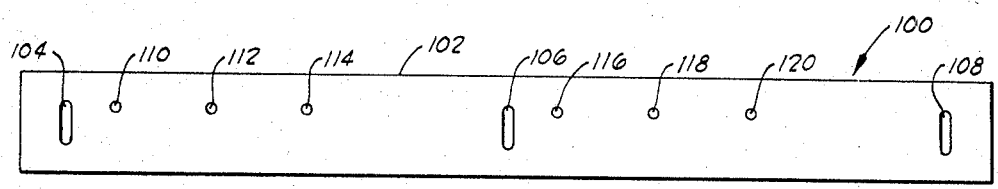
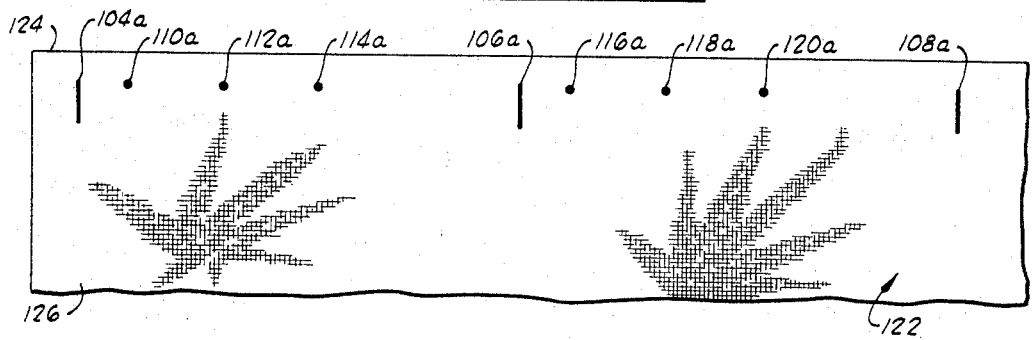
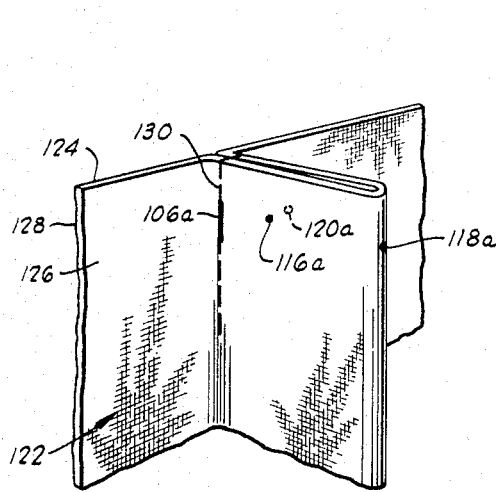
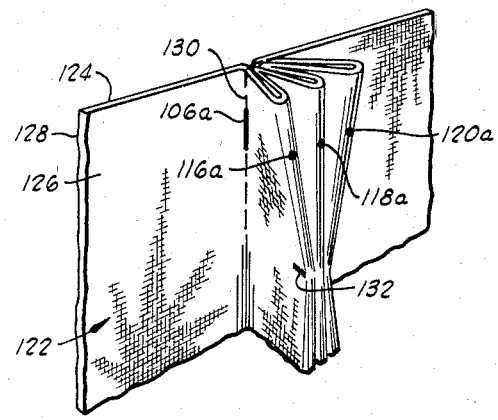

Feb. 20, 1968 J. HENRY 3,369,303
PLEATING METHODS AND APPARATUS
Filed April 18, 1966 3 Sheets-Sheet 3

INVENTOR.
JENNIE HENRY
BY
Dunlap and Janey
ATTORNEYS

United States Patent Office 3,369,303
Patented Feb. 20, 1968

3,369,303
PLEATING METHODS AND APPARATUS
Jennie Henry, 425 W. Douglas Drive,
Midwest City, Okla. 73110
Continuation-in-part of application Ser. No. 392,694,
Aug. 28, 1964. This application Apr. 18, 1966, Ser.
No. 543,323
2 Claims. (Cl. 33—174)

ABSTRACT OF THE DISCLOSURE

A method of pleating fabrics with equi-sized, symmetrical pleats which includes the steps of first forming a substantially monoplanar template having apertures of two differing shapes formed therethrough, with all of the apertures arranged in sets, with each set including at least one aperture of each shape, and all of the sets being equally spaced along the template from each other. The arrangement of apertures in the template is such that if the template is folded along parallel lines extended through each of the apertures of one shape, and these parallel fold lines are then placed against the template in parallelism and in a location where each fold line lies across an adjacent aperture of the second shape, symmetrical, equi-sized pleats will be formed in the template. The template, in an unfolded, substantially monoplanar state is laid flat on the fabric and indicia are placed on the fabric corresponding in number and in geometric distinctiveness to the apertures in the template. Such indicia are formed by extending a marking device through the several apertures. The fabric is then folded or creased along parallel lines extending through one group of indicia corresponding to apertures of one shape, and these fold lines are then brought into alignment with other indicia corresponding to apertures of the second shape to form symmetrical, equi-sized and equally spaced pleats. The pleats are then permanently secured in the fabric by sewing.

---

This application is a continuation-in-part of my abandoned copending application Ser. No. 392,694, filed Aug. 28, 1964, entitled, Sewing Guide.

This invention relates generally to improved methods and templates for forming pleats in a sheet of cloth or the like. More particularly, but not by way of limitation, this invention relates to an improved template having a plurality of spaced apertures extending therethrough for locating indicia on the sheet of cloth or the like to indicate fold and sewing lines and the positions thereof on such sheets whereby pleats may be formed therein.

Heretofore, the formation of pleats in a sheet of cloth or the like has been carried out manually and involves relatively complex mathematical and layout procedures for determining the proper spacing and size of the pleats and their location on the sheet. Generally, such procedures have, at best, indicated only the spacing of the pleats on the sheet, but have not indicated the precise lines wherein the sheet should be folded to produce the desired pleat form.

Also, there have been several devices proposed and some have been manufactured that aid in locating the pleats on the sheet. None of these devices have been commercially successful. Generally, such devices are reasonably helpful in locating the area on the sheet wherein the pleats are to be formed and, therefore, to some extent, an aid in the proper spacing of the pleats. However, most such devices are so complex that their use is extremely difficult and in many cases, the person desiring to pleat the sheet resorts to the previously mentioned manual method.

In one aspect of the present invention, there is provided a template for placing marking and folding indicia on the sheet which comprises an elongated member arranged to be positioned adjacent the top edge and in juxtaposition with one surface of the sheet, the elongated member has a plurality of apertures extending therethrough and spaced therealong, each of the apertures locate an index on the sheet, whereby folding and arranging the sheets in accordance with the indicia placed thereon forms the desired pleats.

In another aspect of the invention, there is provided a method of forming pleats in a sheet of cloth or the like having a top edge and front and rear surfaces. The method includes the steps of: placing a template having a plurality of spaced apertures extending therethrough adjacent the top edge of the sheet and in juxtaposition with one surface thereon; marking the sheet through each of the apertures; folding the sheet at a specified portion of the marks; and, placing the folds at the remaining marks to form pleats in the sheet.

One object of the invention is to provide an improved template that can be used in conjunction with a sheet of cloth or the like for quickly and easily forming pleats of the desired configuration and spacing in the sheet.

Another object of the invention is to provide an improved template that can be utilized to quickly and easily mark indicia on a sheet of cloth or the like whereby the desired configuration of pleats can be formed in the sheet.

Another object of the invention is to provide an improved method for forming pleats in a sheet of cloth or the like that can be performed by a relatively unskilled person.

Still another object of the invention is to provide an improved method for forming pleats in a sheet of cloth or the like that can be quickly and easily accomplished.

The foregoing and additional objects and advantages of the invention will become more apparent as the following detailed description is read in conjunction with the accompanying drawings wherein like reference characters denote like parts in all views and wherein:

FIG. 1 is a plan view of a template constructed in accordance with the invention that is utilized in forming flat pleats in a sheet of cloth or the like;

FIG. 2 is a plan view of a fragment of a sheet of cloth or the like that has been marked for flat pleating utilizing the template of FIG. 1;

FIG. 3 is a perspective view of the sheet fragment of FIG. 2 after the flat pleats have been formed therein in accordance with the invention;

FIG. 4 is a plan view of another embodiment of template that can be utilized in forming box pleats in a sheet of cloth or the like and that is also constructed in accordance with the invention;

FIG. 5 is a plan view of a fragment of a sheet of cloth or the like that has been marked for box pleating utilizing the template of FIG. 4;

FIG. 6 is a perspective view illustrating the sheet fragment of FIG. 5 after the box pleats have been formed therein in accordance with the invention;

FIG. 7 is a plan view of still another embodiment of template that is also constructed in accordance with the invention and is arranged for use in forming pleats in a sheet of cloth or the like;

FIG. 8 is a plan view of a fragment of a sheet of cloth or the like that has been marked utilizing the template of FIG. 7;

FIG. 9 is a perspective view of a portion of the sheet fragment of FIG. 8 illustrating an intermediate step in forming pleats in accordance with the method of the invention;

FIG. 10A is a view similar to FIG. 9, but illustrating the sheet fragment of FIG. 9 after pinch pleats have been formed therein in accordance with the invention;

*Embodiment of FIG. 1*

Figure 11:
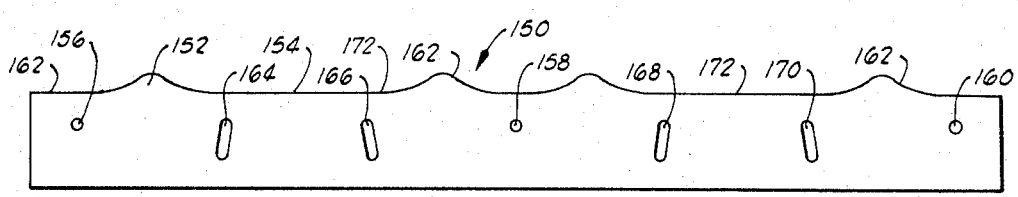
FIG. 11 is a plan view of an additional embodiment of pleating template also constructed in accordance with the invention.

Referring to the drawing and to FIG. 1 in particular, shown therein and generally designated by the reference character 20 is a pleating template that is constructed in accordance with the invention. As shown therein, the template 20 comprises an elongated member 22 having a plurality of apertures extending therethrough and spaced therealong.

The apertures may be of any desired configuration, but in one preferred form of the invention a series of first apertures are designated by the reference characters 24, 26, 28, 30 and 32 and are circular in configuration. The apertures 24, 26, 28, 30 and 32 may be termed indexing apertures as this designation is somewhat descriptive of the function that they fulfill in the pleating method of the present invention. A second series of the apertures 34, 36, 38 and 40 are slot-like in form. The apertures 34, 36, 38 and 40 may be termed folding line apertures as this designation is somewhat descriptive of the function which they perform in the method of the present invention. As clearly shown in FIG. 1, the apertures are arranged in spaced sets, each comprising a circular aperture and a slot, for example 24–34; 26–36; 28–38; and 30–40. Preferably, the circular aperture and slot of each set are equally spaced and each set of apertures is equally spaced from the adjacent sets.

It will be noted therein that the circular aperture 32 is formed near the right hand end of the elongated member 22. The aperture 32 is located as shown and described so that the template 20 can be utilized on materials longer than the template 20 as will be described more fully hereinafter.

FIG. 2 illustrates a fragment of a sheet of material, such as cloth or the like, that is generally designated by the reference character 42. As shown therein, the sheet 42 includes a top edge 44, a front surface 46 and a rear surface 48 (see FIG. 3).

As illustrated in FIG. 2, a series of dots or indexes 24a, 26a, 28a, 30a and 32a have been formed on the front surface 46 of the sheet 42 by positioning the template 20 adjacent the top edge 44 of the sheet 42 in juxtaposition with the front surface 46 thereof and inserting a marking instrument through the circular apertures 24, 26, 28, 30 and 32. Similarly a series of lines 34a, 36a, 38a and 40a have been formed on the surface 46 of the sheet 42 by inserting a marking instrument through the slots 34, 36, 38 and 40 in the template 20. By comparing FIGS. 1 and 2, the correspondence between the series of dots and series of lines designated by the suffix "a" with the circular apertures and slots in the template 20 may be clearly seen.

In the event that the sheet 42 is of greater length than the template 20, the template 20 is moved along the top edge 44 of the sheet 42 until the circular aperture 24 coincides with the dot or index 32a. When the template 20 is positioned in this manner, the foregoing marking procedure is repeated. The marking procedure is repeated until the desired length of the sheet 42 has been marked.

As another way of describing the arrangement of the circular and slotted apertures in the template 20, it may be said that these apertures are arranged so that if the template were folded along the fold line apertures 34, 36, 38 and 40 with the resulting fold lines being parallel to each other and extending substantially perpendicular to the edge of the template, these fold lines could then be placed on the appropriate adjacent indexing apertures 24, 26, 28, 30 and 32 while retaining their parallelism to form symmetrical, equally spaced pleats in the template.

FIG. 3 illustrates the configuration of the sheet 42 with a plurality of flat pleats formed therein. The formation of the pleats is accomplished by folding the sheet 42 along fold lines indicated by the lines 34a, 36a, 38a and 40a. The folds are then placed adjacent the surface 46 of the sheet 42 in the positions indicated by the indexes 26a, 28a, 30a and 32a. For example, the fold corresponding to the line 34a is placed adjacent the index 26a, the fold corresponding to the line 36a is placed adjacent the index 28a, the fold corresponding to the mark 38a is placed adjacent the index 30a, and the fold corresponding to the line 40a is placed adjacent the index 32a.

While only four flat pleats are indicated in FIG. 3, it will be understood that the foregoing procedure is repeated until the desired length of the sheet 42 is pleated. After the flat pleats are formed in the sheet 42, the sheet 42 is stitched along the dash line indicated by the reference character 50 to hold the pleats permanently in the sheet 42. Manifestly, any suitable means may be utilized to hold the pleats in the sheet 42 in lieu of the stitches 50. If the sheet 42 is of sufficient stiffness, the pleats may stay in the sheet 42 on their own accord.

From the foregoing, it can be appreciated that the pleating template 20 provides a means for quickly and easily marking the sheet 42, whereby flat pleats may be quickly and easily formed therein. The pleats will be properly spaced and of equal size when the foregoing procedure is followed. Also, it can be appreciated that little skill is required to perform the pleating process.

*Embodiment of FIG. 4*

FIG. 4 illustrates another embodiment of pleating template generally designated by the reference character 60 and also constructed in accordance with the invention. As shown therein, the template 60 includes an elongated member 62 having a plurality of apertures extending therethrough and spaced therealong.

In the preferred form of the template 60, the apertures include circular apertures 64, 66 and 68 and slots 70, 72, 74 and 76. While the apertures may all be of the same configuration, it is preferred to provide different configurations for convenience of the operator in performing the pleating process as will be described.

The apertures are arranged in two sets of four apertures each. For example, one set includes the circular apertures 64 and 66 and the slots 70 and 72. The second set includes circular apertures 66 and 68 the slots 74 and 76. Note that the aperture 66 is common to both sets. Adjacent sets (not shown), left and right of those shown will include the aperture 64 and 68, respectively, as a common aperture.

FIG. 5 illustrates a fragment of a sheet of cloth or the like generally designated by the reference character 78. The sheet 78 includes a top edge 80, a front surface 82, and a rear surface 84 (see FIG. 6).

As clearly shown in FIG. 5, a series of dots or indexes 64a, 66a, and 68a have been formed on the surface 82 of the sheet 78 by positioning the template 60 along the top edge 80 in juxtaposition with the surface 82 and inserting a marking instrument through the apertures 64, 66 and 68. Similarly, the surface 82 of the sheet 78 is provided with a plurality of lines 70a, 72a, 74a and 76a that have been formed thereon by inserting the marking instrument through the slots 70, 72, 74 and 76 in the template 60. The correspondence between the dots and lines designated by the suffix "a" with the circular apertures and slots in the template 60 can be easily seen by comparing FIGS. 4 and 5.

If the sheet 78 is of greater length than the template 60, the remaining portion of the sheet 78 is marked as previously described by shifting the position of the template 60 until the circular aperture 64 in the template 60 coincides with the index 68a on the surface 82. When the template 60 is positioned in this manner, the sheet 78 is repeatedly marked until the desired length thereof is marked.

As shown most clearly in FIG. 6, the apertures provided in the template 60 are arranged to permit the formation of two complete box pleats. Manifestly, the template 60 can be constructed of a length sufficient to form either more or less in the two box pleats shown.

To form the box pleats from the sheet 78, the sheet 78 is creased or folded along the lines 70a, 72a, 74a and 76a. The fold line formed along the mark 70a is then placed adjacent the index 64a and the fold line along the mark 72a is placed adjacent the index 66a. Placing the fold lines as described forms the reverse folds to complete the structure of one box pleat. Due to the angle of the perspective view of FIG. 6 and the fact that the pleats are not illustrated as being folded completely flat, it appears that the lines 70a and 72a are spaced from the indexes 64a and 66a, respectively. However, when the pleats are flattened, the respective lines and indexes will be located as described.

Similarly, the fold along the line 74a is placed adjacent the index 66a and the fold along the line 76a is placed adjacent the index 68a, resulting in the reverse folds and the formation of an additional complete box pleat. Manifestly, the foregoing procedure is repeated until the desired length of the sheet 78 is formed in box pleats.

If desired, the pleated sheet 78 may be stitched along the line indicated by dash line 86, thereby holding the box pleats permanently in the sheet 78. As previously mentioned, other suitable means may be utilized to hold the sheet 78 pleated or if the material is of sufficient stiffness, the stitching or other holding means may be entirely eliminated.

It should be emphasized that a great deal of difficulty is encountered in laying out box pleats by prior known methods due partly to the mathematical computations involved in attempting to attain the precise size of pleats desired and the proper spacing thereof. Manifestly, the method of forming box pleats utilizing the template 60 is extremely simple and may be quickly performed and will consistently result in the desired size and spacing of the box pleats. It should also be pointed out that little or no skill is required in utilizing the template 60 to form box pleats in the sheet 78.

*Embodiment of FIG. 7*

FIG. 7 illustrates another embodiment of pleating template that is generally designated by the reference character 100 and is also constructed in accordance with the invention. As shown therein, the pleating template 100 includes an elongated member 102 having a plurality of apertures extending therethrough and spaced therealong.

The apertures are divided into series of four apertures each. Each series being arranged to provide for the formation of a separate pleat.

Slot-like apertures 104, 106, and 108 are spaced along the elongated member 102. Circular apertures 110, 112 and 114 constitute the first series of apertures in conjunction with the slot 104. Similarly, circular apertures 116, 118 and 120 constitute the second series of apertures in conjunction with the slot 106. The third slot 108 is provided as an index for use when additional pleats are to be formed as will be described.

FIG. 8 illustrates a sheet 122, which may be drapery cloth or the like, having a top edge 124, a front surface 126, and a rear surface 128 (see FIG. 9). With the template 100 positioned adjacent the top edge 124 of the sheet 122 and in juxtaposition with the front surface 126 thereon, a marking device is inserted through the apertures in the template 100 to scribe the lines 104a, 106a and 108a thereon. Similarly, the marking instrument is inserted through the circular apertures 110, 112, 114, 116, 118 and 120 to mark the dots or indexes 110a, 112a, 114a, 116a, 118a and 120a on the surface 126. Although the template 100 is not shown superimposed on the sheet 122, the correspondence between the apertures in the template 100 and the marks on the surface 126 can easily be seen by comparing FIGS. 7 and 8.

The template 100 as previously indicated, has two series of apertures therein which will result in the formation of two pleats on the sheet 122. Additional pleats may be laid out on the sheet 122 by repositioning the template 100 with the slot 104 in coincidence with the line 108a. Since the pleats are repetitive, FIG. 9 has been simplified and illustrates the formation of only one pleat.

As shown therein, the sheet 122 has been folded on the index 118a and along the line 106a. After the fold on the index 118a is made, the sheet 122 is stitched along the line 106a as shown by the dash line 130.

After the sheet 122 has been stitched along the line 130, the sheet 122 is folded on the indexes 116a and 120a. The indexes 116a, 118a and 120a are then placed together to form the inverse folds as clearly illustrated in FIG. 10A. When the folding has been completed, the sheet 122 is sewn or tacked together as shown at 132, holding the pleat in its finished form. The finished pleat as illustrated in FIG. 10A is generally referred to as a pinch peat.

Other pleat forms may also be constructed utilizing the template 100. Examples of other pleat forms are illustrated in FIGS. 10B and 10C.

Figure 10C:
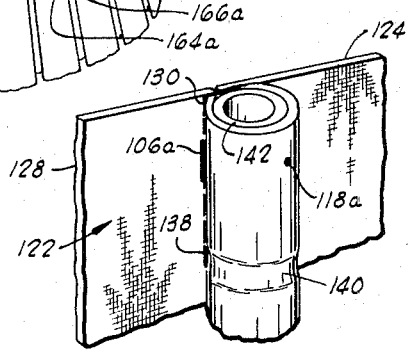
FIG. 10C is a view similar to FIG. 10A, but illustrating still another form of pleat.
Figure 10B:
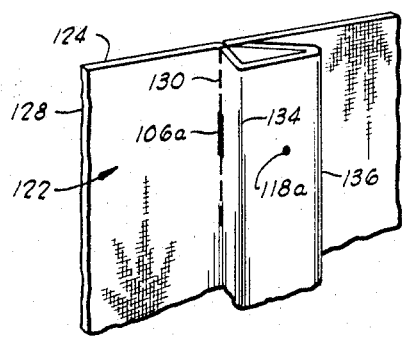
FIG. 10B is a view similar to FIG. 10A, but illustrating another form of pleat.

After the sheet 122 has been formed as described in connection with FIG. 9, the material contained by the stitches 130 is deformed outwardly into a triangular configuration as illustrated in FIG. 10B. The material is then pressed or severely creased along lines 134 and 136 so that the pleat takes the triangular configuration as shown therein. It should also be pointed out that such pleats are usually formed in drapery materials wherein a stiff member (not shown), such as crinoline, is incorporated in the sheet 122 adjacent the top edge 124.

FIG. 10C illustrates a circular form of pleat. Again, the sheet 122 is formed as described in connection with FIG. 9.

After this has been completed, the material is double stitched as shown at 138, thereby providing a small reduction or throat 140 in the pleat. A cylindrical member 142, which is usually constructed from cardboard or similar stiff material, is inserted in the pleat from the top edge 124 of the sheet 122 to retain the pleat in the circular or cylindrical form as illustrated in FIG. 10C.

Thus, it is possible by the use of the template 100 to quickly and easily form a variety of pleat forms that will be equally spaced along the sheet 122. As previously pointed out in connection with the other embodiments of the invention, the template 100 may also be utilized by a person having relatively little skill and, yet, result in the quick and easy formation of aesthetically pleasing pleats. Manifestly, if such pleats are located in drapes or curtains or the like, it can be appreciated from the foregoing that the pleats will be extremely uniform and will be equally spaced without the difficulty and time usually involved in the layout and construction of such items.

*Embodiment of FIG. 11*

FIG. 11 illustrates another embodiment of pleating template generally designated by the reference character 150 and also constructed in accordance with the invention. As shown therein, the pleating template 100 comprises an elongated member 152 having a scalloped edge 154. A plurality of apertures extend through the elongated member 152 and are spaced therealong.

The apertures include three circular apertures 156, 158 and 160 that extend through the elongated member 152 and are disposed relatively centrally with respect to smaller scalloped portions 162 on the edge 154. It will be noted that the apertures 156 and 160 are located directly beneath scalloped portions each of which constitutes one half of the small central scallop portion 162.

The apertures also include a plurality of slots 164, 166, 168 and 170 that also extend through the elongated member 152 and are disposed at an angle, whereby the upper ends of the slots 164 and 166 and the upper ends of the slots 168 and 170 are disposed closer together than the lower ends thereof. It will also be noted that the slots 164 and 166 and the slots 168 and 170 are disposed below relatively large identical scalloped portions 172 formed on the scalloped edge 154.

Figure 12:
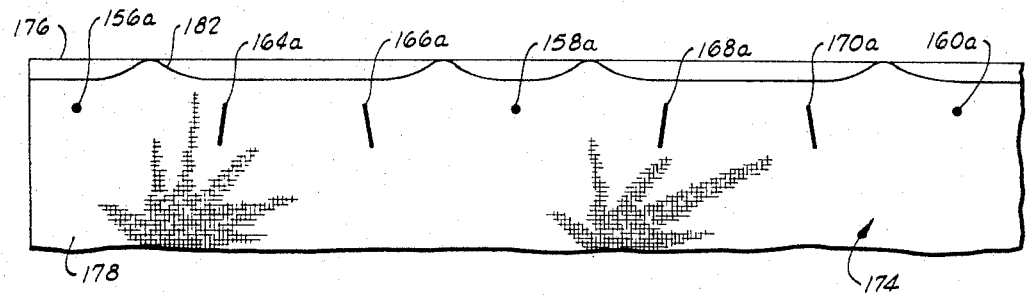
FIG. 12 is a plan view of a fragment of a sheet of material that has been marked utilizing the template of FIG. 11; and, FIG. 13 illustrates the sheet of FIG. 12 after the box pleats have been formed therein in accordance with the invention.
Figure 13:
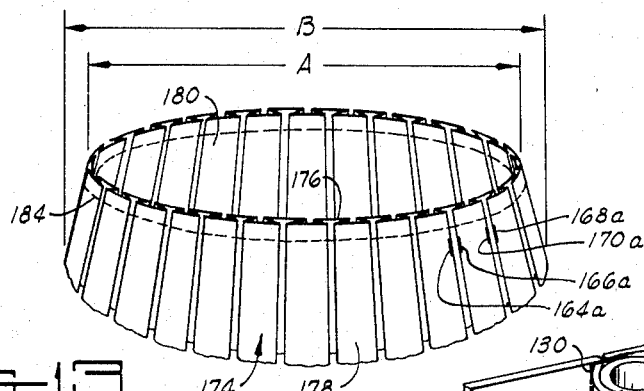

FIG. 12 illustrates a fragment of a sheet 174 having a top edge 176, a front surface 178 and a rear surface 180 (see FIG. 13). It will be noted in FIG. 12 that the front surface 178 thereon is scribed with a scalloped mark 182 that corresponds to the scalloped edge 154 of the template 150 and is formed thereon by running a marking device along the scalloped edge 154 of the template 150.

Dots or indexes 156a, 158a and 160a are formed on the surface 178 by extending the marking device through the apertures 156, 158 and 160 when the template 150 is arranged adjacent the top edge 176 of the sheet 174 and in juxtaposition with the front surface 178. Similarly, the front surface 178 is provided with lines 164a, 166a, 168a and 170a that have also been placed thereon by extending the marking device through the slots 164, 166, 168 and 170 of the template 150. The correspondence between the indexes and the lines with the corresponding circular apertures and slots of the template 150 can be seen by comparing FIGS. 11 and 12.

By comparing FIG. 11 with FIG. 4, it can be seen that there is a general correspondence between the location of the circular apertures and the slots in the templates 150 and 60. Thus, it can be appreciated that the template 150 is also arranged to be utilized in forming box pleats as was the template 60.

However, it has been found that when the material or sheet is to be formed into a circular configuration and particularly where the diameter A (see FIG. 13) at the top edge 176 of the material 174 is to be smaller than the diameter B located relatively therebelow, the top edge 176 will be uneven when using a template such as the template 60, complicating the attachment of a band or the like thereto.

Also, if the pleats are formed with equal dimensions top and bottom as is the case when using the template 60, the resulting configuration is a cylindrical pleated form. In some applications such a cylindrical form is acceptable, but when forming a box pleated skirt, which must fit at the waist and extend outwardly over the hips, the box pleats will not lie smooth. Thus, the scalloped edge 154 and the angularly disposed slots 164, 166, 168 and 170 have been provided on the template 150 so that the resulting configuration of the box pleated sheet 174, when formed in a circle, will be the surface of a truncated cone having a smooth top edge 176 as illustrated in FIG. 13.

To form the sheet 174 with box pleats as illustrated in FIG. 13, the sheet 174 is folded along the lines 164a, 166a, 168a and 170a. The folds are then placed adjacent the nearest index 156a, 158a or 160a.

For example, the formation of one box pleat results when the fold corresponding to line 164a is placed adjacent the index 156a, forming a reverse fold in the sheet 174 and the fold corresponding to the line 166a is placed adjacent the index 158a resulting in the second reverse fold and the completion of the box pleat. The folding procedure is repeated until the desired length of sheet 174 has been box pleated.

After the sheet 174 has been pleated, it may be stitched as indicated by the dash line 184 to hold the pleats permanently in place. Manifestly, a band or other device may be attached to the top of the pleated sheet 174 if desired.

The template 150 can be utilized to lay out and form box pleats in the sheet 174 quickly and easily and by a relatively unskilled person. As will be appreciated by those skilled in the art, the layout of box pleats and particularly those which must be configured as illustrated in FIG. 13, is an extremely difficult task which heretofore has been successfully accomplished only by the most skilled seamstress.

From the foregoing detailed description of the various embodiments of the invention, it can be appreciated that each template described can be used to quickly and easily lay out a sheet for pleating. Also, each template is arranged whereby a relatively unskilled person can successfully form the pleats in the desired manner. It should be pointed out that while specific arrangements of the apertures have been described, the spacing thereof and the spacing between series of such apertures may be varied to provide changes in the size and spacing of the pleats as desired. The apertures may be formed in any desired configuration.

The embodiments described in detail hereinbefore have been presented by way of example only and it will be understood that many changes and modifications can be made thereto without departing from the spirit of the invention or from the scope of the annexed claims.

What I claim is:

1. A template for forming box pleats in a sheet of cloth or the like having a top edge and front and rear surfaces, said template comprising an elongated member having a scalloped edge arranged to be disposed adjacent the top edge of the sheet when said template is in juxtaposition to one of the surfaces of the sheet, said template having a plurality of apertures extending therethrough, said apertures being arranged in spaced sets of first, second, third and fourth apertures, with said first and fourth apertures being circular configuration, and said second and third apertures being slots, said slots having the ends thereof adjacent said scalloped edge closer together than the ends thereof relatively remote from said scalloped edge, said circular first and fourth apertures being indexing apertures and said second and third apertures being folding line apertures, whereby folding said sheet along lines corresponding to said second and third apertures, placing said second aperture fold on said first aperture index and placing said third aperture fold on said fourth aperture index in repetitive fashion for each set of apertures results in fold lines which extend relatively angularly with respect to each other in a plurality of box pleats, and said box pleated sheet will extend relatively outwardly from the top edge thereof.

2. The method of forming a plurality of identically sized pleats in a sheet of cloth or the like having a substantially linear edge and front and rear surfaces, said method comprising:

forming an elongated substantially monoplanar template having an edge alignable with the linear edge of said sheet and having a plurality of apertures therethrough disposed generally along a line extending the length of the template, said apertures including a first group of folding line apertures of one configuration, and a second group of indexing apertures having a different configuration from said folding line apertures, said apertures being arranged in sets equally spaced from each other with each set including at least one aperture of said first group and one aperture of said second group, and said sets being composed of apertures arranged such that folding of said template along parallel, transversely extending fold lines which each pass through one of the folding line apertures, followed by placing said fold lines in coincidence with lines extending parallel to said fold line and across said indexing apertures, followed by flattening said template, will result in placing a plurality of symmetrical, equally spaced pleats in said template;

placing said template in a flat, monoplanar condition on one of said surfaces with said edge thereof aligned with the linear edge of said sheet;

marking indicia on said sheet by passing a marking device consecutively through said folding line apertures and said indexing apertures and making the indicia conform distinctively to the varying configurations of said apertures;

folding said sheet along lines extending substantially normal to said linear edge and through the indicia formed by extending said marking device through said folding line apertures;

placing each of said fold lines on the front surface of said sheet at a location in which the respective fold line extends perpendicular to the linear edge and crosses an adjacent indicia formed by extending said marking device through one of said indexing apertures, to thereby form a series of symmetrical, identically sized, equally spaced pleats in said sheet; and sewing the pleats into the sheet.

References Cited
UNITED STATES PATENTS

| | | | |
|---|---|---|---|
| 1,145,244 | 7/1915 | Hoffmann | 33—190 |
| 1,742,684 | 1/1930 | Bowman | 33—174 |
| 2,250,718 | 7/1941 | McCloud | 33—190 |
| 2,929,146 | 3/1960 | McNeil. | |

SAMUEL S. MATTHEWS, *Primary Examiner.*